(12) United States Patent
Kapoor et al.

(10) Patent No.: US 12,128,762 B1
(45) Date of Patent: Oct. 29, 2024

(54) COORDINATED VEHICLE DYNAMIC HANDLING BALANCE CONTROL USING TORQUE MANAGEMENT

(71) Applicant: GM GLOBAL TECHNOLOGY OPERATIONS LLC, Detroit, MI (US)

(72) Inventors: Saurabh Kapoor, Windsor (CA); SeyedAlireza Kasaiezadeh Mahabadi, Novi, MI (US); Jason D. Fahland, Fenton, MI (US); Michael A. Ryba, West Bloomfield, MI (US); Cody Wayne Bulkley, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/381,914

(22) Filed: Oct. 19, 2023

(51) Int. Cl.
*B60K 28/16* (2006.01)
*B60K 23/08* (2006.01)
*B60W 50/00* (2006.01)

(52) U.S. Cl.
CPC .......... *B60K 23/0808* (2013.01); *B60K 28/16* (2013.01); *B60L 2260/20* (2013.01); *B60W 2050/0008* (2013.01); *B60W 2520/403* (2013.01); *B60W 2720/403* (2013.01)

(58) Field of Classification Search
CPC . B60K 23/0808; B60K 28/16; B60L 2260/20; B60W 2050/0008; B60W 2520/403; B60W 2720/403
See application file for complete search history.

(56) References Cited

U.S. PATENT DOCUMENTS

| 9,469,199 | B1* | 10/2016 | Gauthier | B60L 3/106 |
| 2002/0105188 | A1 | 8/2002 | Tomikawa | |
| 2004/0176899 | A1* | 9/2004 | Hallowell | B60L 15/2036 |
| | | | | 701/84 |
| 2005/0060079 | A1* | 3/2005 | Phillips | B60K 6/48 |
| | | | | 701/53 |

(Continued)

FOREIGN PATENT DOCUMENTS

| CN | 106314204 A | 1/2017 |
| CN | 107640062 A | 1/2018 |
| CN | 108909529 A | 11/2018 |

(Continued)

OTHER PUBLICATIONS

Office Action dated May 3, 2024 from German Patent Office for German Patent No. 102023134688.1; 7pgs.

*Primary Examiner* — Justin Holmes

(57) ABSTRACT

A chassis control system of a vehicle includes: a first torque source providing torque to a first axle of the vehicle; a second torque source providing torque to a second axle of the vehicle independently of the first torque source; and a vehicle control module controlling the first and second torque sources to transition between a torque redistribution and torque limit control modes based on a wheel torque redistribution threshold, a wheel torque limit of the first axle and/or second axle, and a torque limit of one of the first and second torque sources. The torque redistribution mode refers to when torque is being selectively provided to the first axle by the first torque source and to the second axle by the second torque source. The torque limit control mode refers to when torque to at least one of first axle and the second axle is limited.

20 Claims, 11 Drawing Sheets

(56) References Cited

U.S. PATENT DOCUMENTS

2019/0077258 A1    3/2019  Cho
2019/0092188 A1*   3/2019  Plianos ............... B60L 15/2009

FOREIGN PATENT DOCUMENTS

| DE | 10049567 A1 | 10/2001 | |
| DE | 102011056168 A1 * | 6/2013 | ............... B60K 6/52 |
| DE | 102012201250 A1 | 8/2013 | |
| DE | 102020216118 A1 | 6/2022 | |

* cited by examiner

COORDINATED VEHICLE DYNAMIC HANDLING BALANCE CONTROL USING TORQUE MANAGEMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to chassis control systems, such as vehicle traction control, electronic stability control, and all-wheel drive systems.

Traditional chassis control systems include traction control systems (TCSs), electronic stability control (ESC) systems, and all-wheel drive (AWD) systems. TCS systems detect wheel (or tire) slip and apply brakes at one or more wheels and/or reduce torque supplied to the one or more wheels. ESC systems detect loss of steering control and apply brakes to improve vehicle stability. An AWD system provides power to all wheels concurrently or as demanded.

SUMMARY

A chassis control system of a vehicle is disclosed. The chassis control system includes: a first torque source configured to provide torque to a first axle of the vehicle; a second torque source configured to provide torque to a second axle of the vehicle independently of the first torque source; and a vehicle control module configured to control the first torque source and the second torque source to transition between a torque redistribution mode and a torque limit control mode based on a wheel torque redistribution threshold, a wheel torque limit of at least one of the first axle and the second axle, and a torque limit of one of the first torque source and the second torque source, where the torque redistribution mode refers to when torque is being selectively provided to the first axle by the first torque source and to the second axle by the second torque source, and where the torque limit control mode refers to when torque to at least one of first axle and the second axle is limited.

In other features, the vehicle control module is configured to transition from a normal torque shaping mode to a torque increasing mode based on an amount of torque requested by a driver of the vehicle and the wheel torque redistribution threshold. During the torque increasing mode, the vehicle control module increases torque on the first axle and the second axle concurrently.

In other features, the vehicle control module increases torque on the first axle at a first rate and the second axle at a second rate until the torque on the second axle reaches the wheel torque limit of the second axle at which point the vehicle control module increases torque on the first axle at a third rate and on the second axle at a fourth rate. The third rate is less than the first rate. The fourth rate being less than the second rate.

In other features, the vehicle control module is configured to transition from the torque redistribution mode to the torque limit control mode when the torque on the second axle reaches the wheel torque limit of the second axle including increasing torque to the first axle at a fifth rate and to the second axle at a sixth rate. The fifth rate being less than the third rate. The sixth rate being less than the fourth rate.

In other features, the vehicle control module is configured, during operation in the torque limit control mode, to limit the torque provided to the first axle based on a torque limit of the first torque source, and to refrain from increasing torque on the second axle.

In other features, the vehicle control module is configured to preemptively increase torque to the first axle and to the second axle based on a torque request from a driver of the vehicle.

In other features, the vehicle control module is configured to transition from preemptively increasing torque to the first axle at a first rate and to the second axle at a second rate to operating in a torque increasing mode including increasing torque to the first axle at a third rate and to the second axle at a fourth rate. The third rate being less than the first rate. The fourth rate being different than the second rate.

In other features, the vehicle control module is configured to transition from the torque increasing mode to a torque rate reduction mode, where the torque rate reduction mode includes refraining from increasing the torque to the second axle and maintaining an amount of torque on the second axle below a wheel torque limit of the second axle.

In other features, the vehicle control module is configured to transition from the torque redistribution mode to the torque limit control mode when the torque to the first axle reaches a wheel torque limit for the first axle.

In other features, the vehicle control module is configured: during the torque limit control mode, to transition to a feedback wheel slip control mode; and during the feedback wheel slip control mode and based on speeds of wheels of the first axle and the second axle, to adjust torque of the first axle and allow the wheels of the first axle to slip, and to prevent wheels of the second axle from slipping and maintain torque on the second axle at a level below the wheel torque limit of the second axle.

In other features, the vehicle control module is configured to: determine a lateral acceleration of the vehicle, an amount of torque requested by a driver of the vehicle, a speed of the vehicle, and a road surface condition; determine an operation boundary for understeering angle versus understeering velocity based on the lateral acceleration of the vehicle, the amount of torque requested by the driver of the vehicle, the speed of the vehicle, and the road surface condition; and adjust torque to the first axle and the second axle to maintain operation of the vehicle in the operation boundary.

In other features, the first axle is a front axle. The second axle is a rear axle. The vehicle control module is configured to correlate the operation boundary to a front to rear wheel slip target curve, and to adjust slip of the first axle and slip of the second axle based on the front to rear wheel slip target.

In other features, the vehicle control module is configured, during an oversteering event, to provide an increase the amount of slip of the first axle and then decrease the amount of slip of the first axle to transition the vehicle towards neutral steering.

In other features, the vehicle control module is configured to, based on the lateral acceleration of the vehicle, the amount of torque requested by the driver of the vehicle, the speed of the vehicle, and the road surface condition, i) increase torque to the second axle to a first level, ii) decrease torque to the second axle from the first level to a second level, and iii) then increase torque to the second axle from the second level to a third level.

In other features, the vehicle control module is configured to: determine whether a driver requested amount of torque is greater than the wheel torque redistribution threshold; in response to the driver requested amount of torque being greater than the wheel torque redistribution threshold, provide an amount of torque equal to a torque limit for the first axle from the second torque source to the second axle; and in response to the driver requested amount of torque not being greater than the wheel torque redistribution threshold, transitioning from operating in the torque redistribution mode to the torque limit control mode.

In other features, the vehicle control module is configured to: determine whether an amount of toque provided to the second axle is greater than a wheel torque limit for the second axle; in response to the amount of torque provided to the second axle being greater than a wheel torque limit for the second axle, sending excess torque to the first axle via the first torque source, the excess torque being a difference between a total torque threshold of the first axle and the wheel torque limit of the second axle; and in response to the amount of torque provided to the second axle not being greater than a wheel torque limit for the second axle, transitioning from operating in the torque redistribution mode to the torque limit control mode.

In other features, the vehicle control module is configured to: determine whether a sum of torque provided to the first axle and the excess torque is greater than a wheel torque limit of the first axle; in response to the sum being greater than the wheel torque limit of the first axle, distributing remaining torque between the first axle and the second axle via the first torque source and the second torque source; and in response to the sum not being greater than the wheel torque limit of the first axle, transitioning from operating in the torque redistribution mode to the torque limit control mode.

In other features, a chassis control method is disclosed and includes: determining a lateral acceleration of a vehicle, an amount of torque requested by a driver of the vehicle, a speed of the vehicle, and a road surface condition; determining an operation boundary based on the lateral acceleration of the vehicle, the amount of torque requested by the driver of the vehicle, the speed of the vehicle, and the road surface condition; and controlling a first torque source of a first axle of the vehicle and a second torque source of a second axle of the vehicle to transition between a torque redistribution mode and a torque limit control mode based on the operation boundary, a wheel torque redistribution threshold, a wheel torque limit of at least one of the first axle and the second axle, and a torque limit of one of the first torque source and the second torque source, where the torque redistribution mode refers to when torque is being selectively provided to the first axle by the first torque source and to the second axle by the second torque source, and where the torque limit control mode refers to when torque to at least one of first axle and the second axle is limited.

In other features, the chassis control method further includes: correlating the operation boundary to a wheel slip target; and based on the wheel slip target, adjusting wheel slip of the first axle and wheel slip of the second axle.

In other features, the chassis control method further includes, based on driver torque request inputs and sensor feedback, scheduling non-linear control gains to adjust torque from the first torque source to the first axle and to adjust torque from the second torque source to the second axle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Maintaining consistent vehicle handling (balance) with a human driver-in-the-loop is a complex problem, especially in highly dynamic driving scenarios such as racetrack driving and/or when driving on low friction road surfaces (e.g., road surfaces covered in ice or snow). A TCS system and an ESC system primarily employ the use of torque limitation control to manage wheel slip and yaw stability of a vehicle. An AWD system typically manages vehicle dynamics using torque redistribution control. These systems have limited control and operate independently.

The examples set forth herein include a chassis control system and methods for seamlessly bridging gaps between traditional TCS, ESC and AWD systems. The disclosed chassis control systems provide smooth transitions between a TCS and/or ESC system that provides torque limit control and an AWD system that provides torque redistribution. This is done to enable improved handling dynamics and drivability on and off a racetrack. The disclosed examples aim to provide consistent and tunable driver-centric vehicle handling balance by providing coordination between torque limit control and torque redistribution.

The examples include i) interpreting driver intended vehicle handling balance, ii) preemptive torque control, and iii) integrated feedback control to concurrently control wheel slip and vehicle understeer dynamics. Interpretation of driver intended vehicle handling balance includes i) defining a vehicle handling balance operational boundary based on parameters such as lateral acceleration, road surface condition, propulsion torque requested by driver, and vehicle speed, ii) correlating the operational boundary to a wheel slip target, and iii) scheduling non-linear control gains (i.e., torque to each axle) based on driver inputs and feedback from vehicle sensors. Preemptive control includes i) seamlessly transitioning between a torque redistribution mode to a torque limit control mode to achieve a target vehicle handling balanced state, and ii) transitioning to feedback wheel slip control, as further described below.

Figure 1:
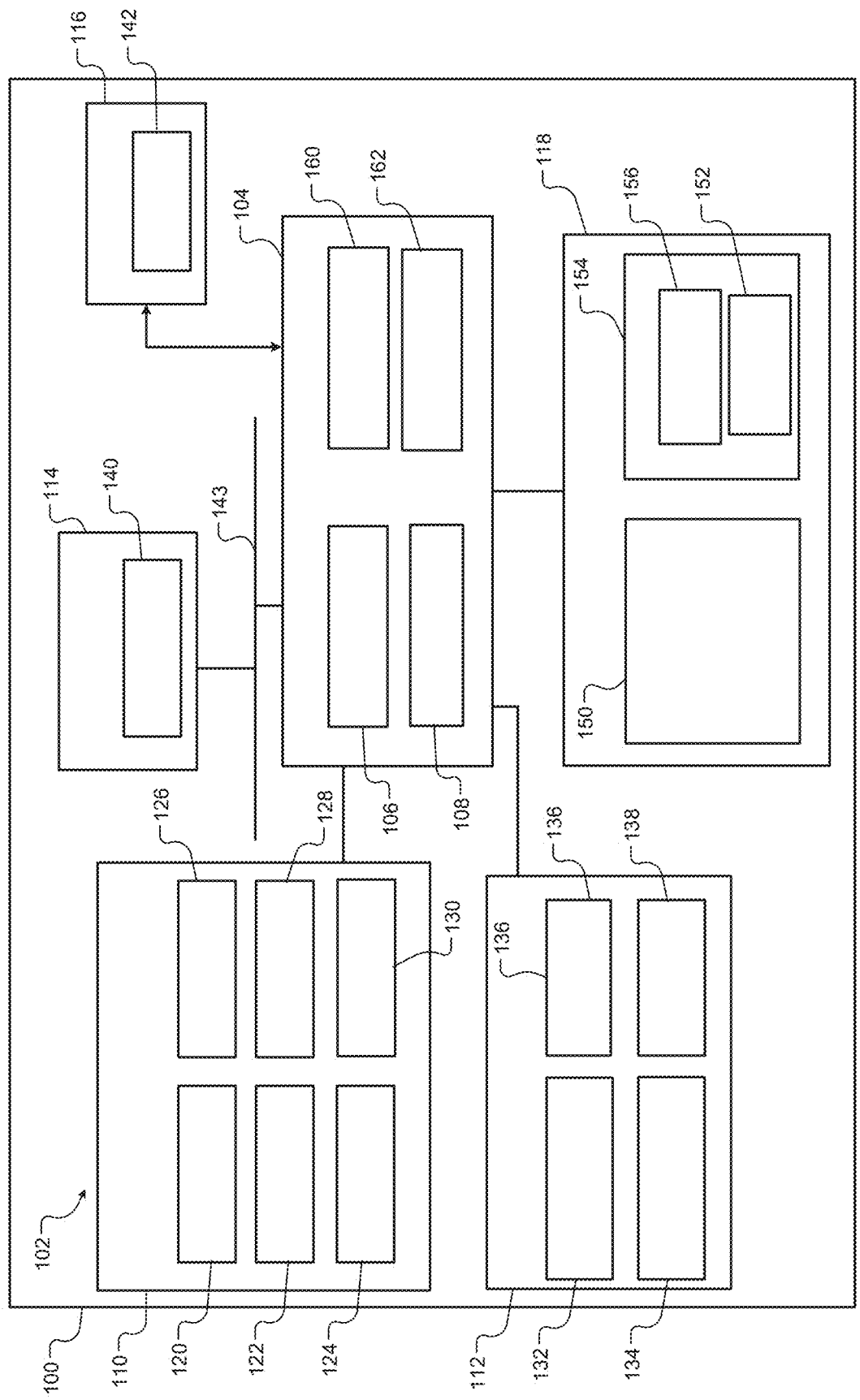
FIG. 1 is a functional block diagram of a vehicle including an example chassis control system having a vehicle control module with a phase plane module and a wheel slip and yaw module in accordance with the present disclosure.

FIG. 1 shows vehicle 100 including a chassis control system 102 having a vehicle control module 104. The vehicle control module 104 includes a phase plane module 106 and a wheel slip and yaw module 108. The phase plane module 106 operates based on a relationship between understeer angle and understeer velocity. The phase plane module 106 controls yaw dynamics (or behavior) of the vehicle 100 and chassis thereof by maintaining yaw behavior of the chassis within set driver-controllable boundaries to allow the vehicle 100 to be driven with maximum controllability. Enhanced vehicle control is provided at limits of actuator authority to maintain the vehicle 100 in a balanced handling state. The wheel slip and yaw module 108 performs intelligent switching between managing i) a relative slip target between a front axle and a rear axle (or front axles and rear axles), and ii) individual wheel slip to maximize handling performance. In an embodiment, the modules 106, 108 are software modules executed by the vehicle control module 104. Operations performed by the modules 106, 108 are further described below.

The vehicle 100 further includes sensors 110, memory 112, an accelerator pedal actuator 114, a steering system 116, and a propulsion system 118. The sensors 110 may include wheel speed sensors 120, a vehicle speed sensor 122, a yaw rate sensor 124, an inertial measurement unit (IMU) 126, acceleration sensors (e.g., longitudinal and lateral acceleration sensors) 128, and other sensors 130. The memory 112 may store sensor data 132, operation boundary information 134, applications 136, parameters 138, etc. The sensor data 132 may include data collected from the sensors 110 and/or other sensors, such as an accelerator position sensor 140 of the accelerator pedal actuator 114, and a steering angle sensor 142 of the steering system 116. The accelerator pedal actuator 114 and accelerator position sensor 140 and/or other devices referred to herein may be connected to the vehicle control module 104 via a controller area network (CAN) or other network bus 143. The operation boundary information 134 may include equations, tables, etc. for determining edges, sizes and shapes of operation boundaries. The operation boundaries refer to understeering angles, understeering velocities, and understeering angle versus understeering velocity boundaries described below. The vehicle control module 104 may control the propulsion system 118 to maintain operation in a selected one of the operation boundaries based on the sensor data. The applications 136 may include the modules 106, 108 and/or other applications.

The propulsion system 118 may include two or more torque sources, such as one or more motors and/or one or more engines (e.g., internal combustion engines). In the example shown in FIG. 1, the vehicle 100 includes an engine and one or more motors 152. The torque sources are independently controlled. The propulsion system includes a motor control system 154 that includes the one or more motors 152 and a motor control module 156 that may control operation of the one or more motors 152 based on signals from the vehicle control module 104.

The vehicle control module 104 may further include a mode selection module 160 and/or a parameter adjustment module 162. The modules 106, 108, 160 may select different operating modes, such as a redistribution mode, a torque limit control mode, a transition (or partial torque redistribution and partial torque limit control) mode, a normal torque shaping mode, front and rear axle torque increasing mode, a front and rear axle torque rate decreasing mode, a dynamic torque shaping mode, a preemptive torque distribution mode, a feedback wheel slip control mode, a neutral steering mode, an understeering mode, an oversteering mode, a counter steering mode, a drift mode, a drop throttle mode, a recovery mode, etc. The vehicle may operate in two or more of these modes at the same time. The torque redistribution mode refers to when torque is being selectively provided to front and rear axles of the vehicle 100. The torque limit control mode refers to when torque to front and/or rear axles is being limited. The stated modes of operation are further described below.

Figure 2:
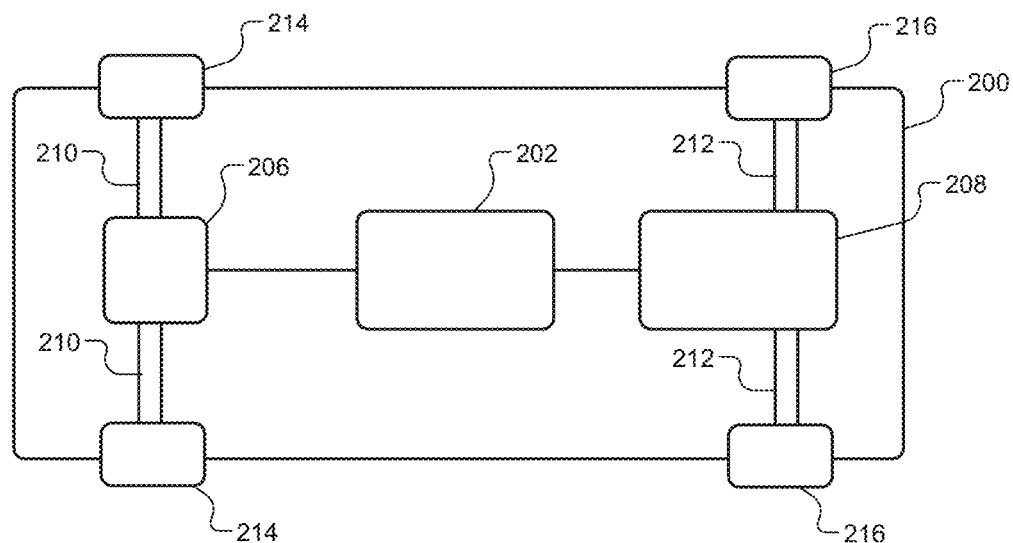
FIG. 2 is a functional block diagram of an example vehicle including independently controlled torque sources controlled via a vehicle control module in accordance with the present disclosure.

FIG. 2 shows a vehicle 200 including independently controlled torque sources controlled via a vehicle control module 202. The torque sources include a motor 206 and an engine 208. The torque sources may include other torque sources (e.g., two or more motors). The vehicle control module 202 may be configured and operate similarly as the vehicle control module 104 of FIG. 1. The vehicle control module 202 controls operation of the torque sources to control the amounts of torque received by one or more front axles 210 and one or more rear axles 212 and thus to front wheels 214 and rear wheels 216. This stated control includes torque-based control as described below for the disclosed various operating modes.

Figure 3:
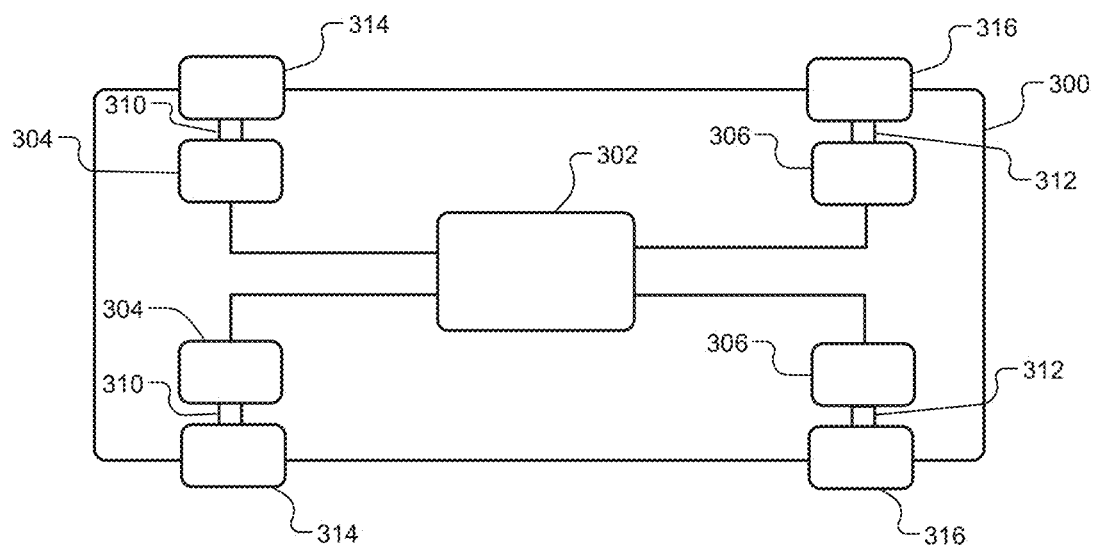
FIG. 3 is a functional block diagram of another example of a vehicle including independently controlled torque sources controlled via a vehicle control module in accordance with the present disclosure.

FIG. 3 shows a vehicle 300 including independently controlled torque sources controlled via a vehicle control module 302. The torque sources include one or more front motors 304 (two are shown) and one or more rear motors 306 (two are shown). The vehicle control module 302 may be configured and operate similarly as the vehicle control module 104 of FIG. 1. The vehicle control module 302 controls operation of the torque sources to control the amounts of torque received by one or more front axles 310 and one or more rear axles 312 and thus to front wheels 314 and rear wheels 316. This stated control includes torque-based control as described below for the disclosed various operating modes.

Figure 4:
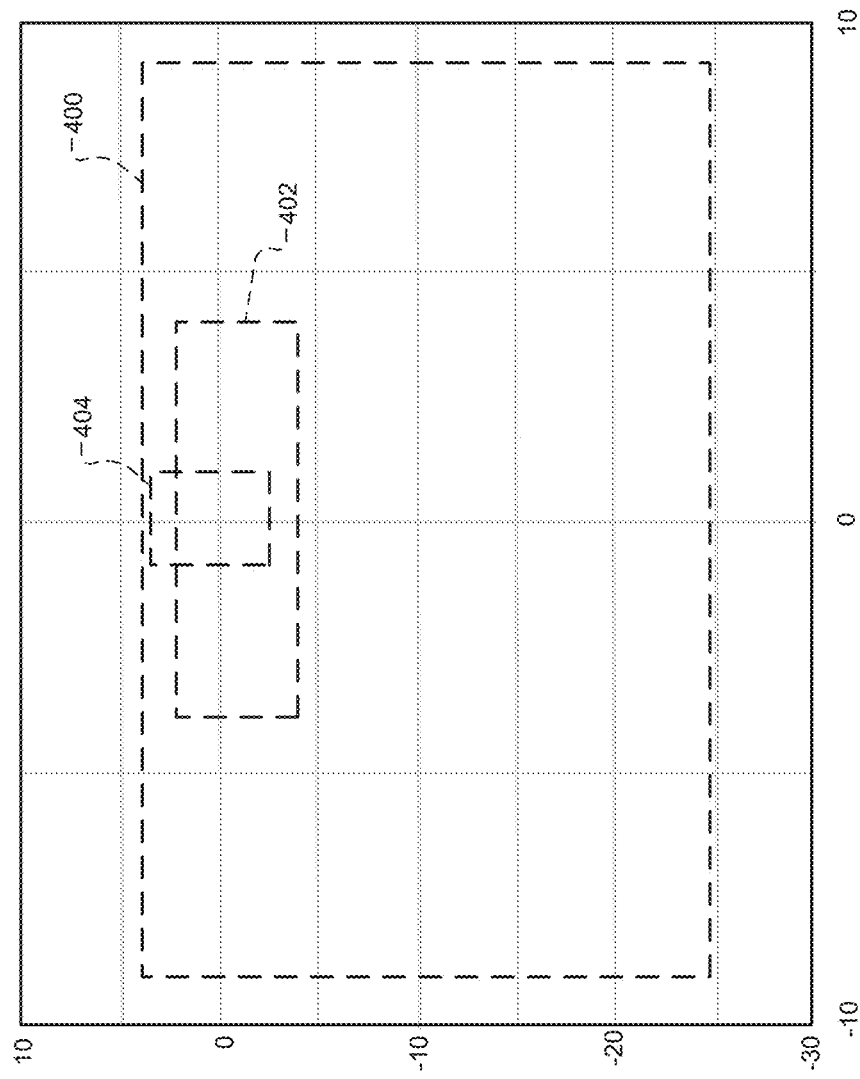
FIG. 4 is an example plot for understeering angle versus understeering velocity illustrating three different operation boundaries based on different sets of operating parameters and road conditions in accordance with the present disclosure.

FIG. 4 shows a plot for understeering angle versus understeering velocity illustrating three different operation boundaries based on different sets of operating parameters and road conditions. Three example boundaries 400, 402, 404 are shown for three different sets of operating parameters and road conditions. The operating parameters include vehicle speed Vx, propulsion torque request Torq, and lateral acceleration Ay. The road conditions refer to levels of friction experienced between tires of the corresponding vehicle and road surfaces. A high Mu refers to a road surface with a high associated level of friction and thus a high amount of tire traction such as when driving on a dry asphalt road. A medium Mu refers to a road surface with a medium associated level of friction and thus a medium amount of tire traction such as when driving on a gravel or wet road. A low Mu refers to a road surface with a low associated level of friction and thus a low amount of tire traction such as when driving on an ice or snow covered road. The boundary 400 is associated with low Ay, low Mu, high Torq, and low Vx. The boundary 402 is associated with high Ay, high Mu, high Torq, and medium Vx. The boundary 404 is associated with high Ay, high Mu, medium Torq, and high Vx. Numerous other boundaries may be determined and/or selected based on the values of Ay, Mu, Torq and Vx.

A vehicle control module (e.g., one of the vehicle control modules of FIGS. 1-3) determines the parameters Ay, Mu, Torq, and Vx and based on these parameters determines and/or selects an operation boundary. The edges, sizes, and shapes of the operation boundary may be determined using equations, look-up tables, etc. and/or may be selected from prestored boundaries. The operation boundary may be determined as a nonlinear function of Ay, Mu, Torq and Vx. The operation boundary includes understeering angle limits and understeering velocity limits within which the vehicle control module remains in. The vehicle control module adjusts torque levels to front and rear axles to remain within the stated understeering angle and velocity limits. In FIG. 4, positive understeering angles refer to levels of understeering, an understeer angle of 0° refers to neutral steering, and negative understeering angles refer to levels of oversteering.

Assuming the vehicle as a bicycle model, the understeer phase portrait can be estimated using equations 1 and 2, where $\alpha^{Under}$ is the understeer angle, $\alpha_F$ is the front tire slip angle, $\alpha_R$ is the rear tire slip angle, $\delta$ is the steering angle, L is a distance between centers of a front wheel and a rear wheel, $\alpha_Y^{CG,max}$ is a maximum lateral acceleration experienced by the center of gravity (CG) of the vehicle, $L_f$ is a distance between a center of a front wheel of the vehicle and the CG, $L_r$ is a distance between a center of a rear wheel of the vehicle and the CG, $\dot{r}$ is yaw velocity, $\mu$ is forward velocity, and g is gravity.

$$\alpha^{Under} = (\alpha_F - \alpha_R) = \delta - \frac{1}{V_x^2}\left(L \cdot a_Y^{CG,max}\right) \quad (1)$$

$$\frac{d\alpha^{Under}}{dt} \approx \frac{(L_f - L_r)\dot{r}}{V_x}, a_Y^{CG,max} = \min(a_Y^{CG}, \mu g) \quad (2)$$

Figure 5:
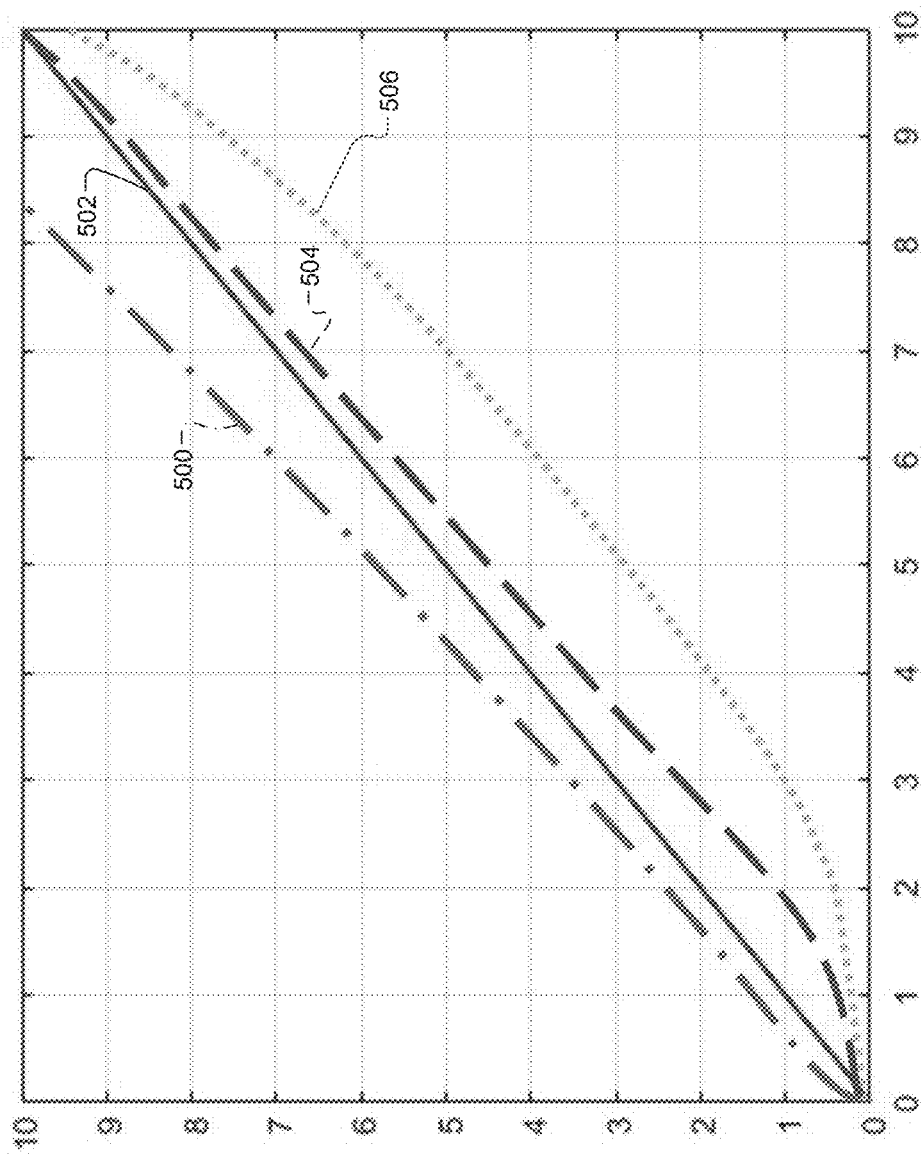
FIG. 5 is an example plot of front axle wheel slip versus rear axle wheel slip including example understeer, neutral steer, and oversteer curves based on different sets of operating parameters and road conditions in accordance with the present disclosure.

FIG. 5 shows a plot of front axle wheel slip versus rear axle wheel slip that includes an example understeer curve 500, an example neutral steer curve 502, a first example oversteer curve 504, and a second example oversteer curve 506. The curves are determined based on Ay, Mu, Torq, and Vx. Neutral steering refers to when there is a one-to-one relationship between front wheel slip (of front wheels (or tires)) and rear wheel slip (of rear wheels (or tires)). Understeer refers to higher front wheel slip than rear wheel slip. Oversteer refers to higher rear wheel slip than front wheel slip.

A vehicle control module (e.g., one of the vehicle control modules of FIGS. 1-3) determines the parameters Ay, Mu, Torq, and Vx and based on these parameters determines whether to follow and/or target an understeer curve, a neutral steer curve, or an understeer curve such as one of the curves shown. Curve 500 may be selected for examples as a regenerative slip target. Curve 502 may be followed and/or targeted when Ay is high, Mu is high, Torq is medium, and Vx is high. Curve 504 may be followed and/or targeted when Ay is high, Mu is high, Torq is high, and Vx is medium. Curve 506 may be followed and/or targeted when Ay is low, Mu is low, Torq is high, and Vx is low.

The determined and/or selected operation boundary is correlated to a front to rear wheel slip target such as one of the example curves 500, 502, 504, 506 or other front wheel slip to rear wheel slip curve. The slope of the selected curve defines the vehicle dynamic characteristics for understeer versus oversteer. As an example, if curve 506 is targeted, the vehicle control module permits a large amount of initial rear wheel slip (as shown by lower left portion of curve 506) to rotate the corresponding vehicle into a turn, as wheel slip develops the balance of the vehicle is shifted from oversteering towards neutral steering to enhance traction and driver confidence, as shown by the upper right portion of curve 506.

Figure 6:
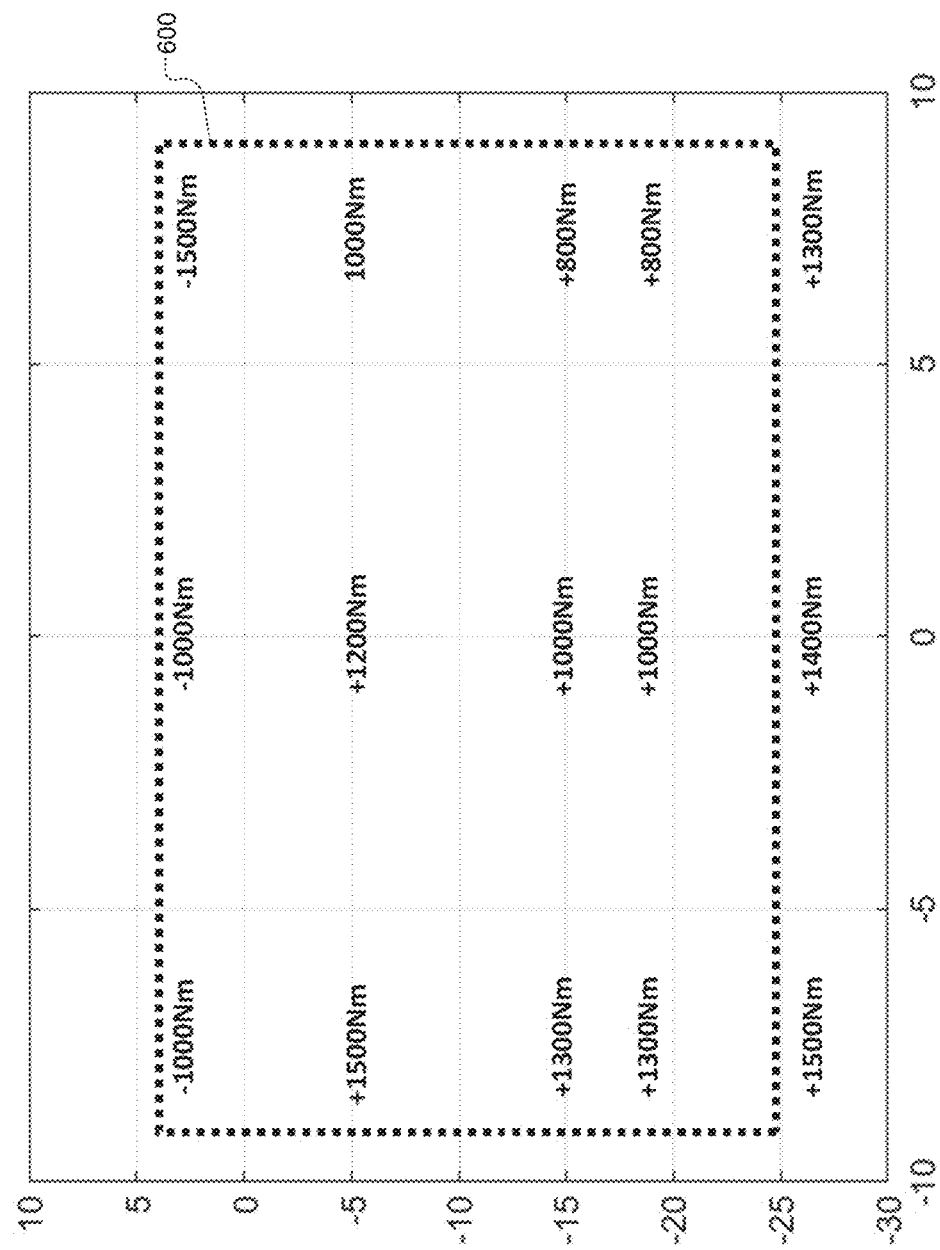
FIG. 6 is an example plot of understeering angle versus understeering velocity including example amounts of torque to be supplied to front and rear axles in accordance with the present disclosure.

FIG. 6 shows a plot 600 of understeering angle versus understeering velocity including example amounts of torque to be supplied to front and rear axles of a vehicle (e.g., one of the vehicles of FIGS. 1-3). The plot provides a method of scheduling non-linear control gains (or non-linear amount of output torque of torque sources) based on driver inputs (e.g., accelerator pedal position and steering angle) and actual vehicle feedback from sensors. An operation boundary 602 is shown along with i) negative torque values that refer to one or more torque sources of one or more rear axles supplying torque to rear wheels, and ii) positive torque values, which refer to one or more torque sources of one or more rear axles supplying torque to rear wheels. These torque values are provided based on Ay, Mu, Torq and Vx values. Positive torque values refer to shifting torque towards one or more front axles. Negative torque values refer to shifting torque towards one or more rear axles. A zero torque value refers to no shift in torque between front and rear axles. Torque may be supplied to both front and rear axles when the vehicle control module is operating within the operation boundary 602.

In certain conditions, the vehicle control module may transition from operating near a top portion of the operation boundary to a bottom portion of the operation boundary. This may occur, for example, when the corresponding vehicle is exiting a turn and accelerating out of the turn. As the vehicle control module moves from a top of the operation boundary to a bottom of the operation boundary, the torque values increase, decrease slightly, and then increase again. The large initial increase in torque (or torque shift) from the rear axle(s) to the front axle(s), is to stabilize vehicle and soften the initial break away event. If oversteer continues, then the vehicle control module determines that the oversteer is intended by the driver.

Figure 7:
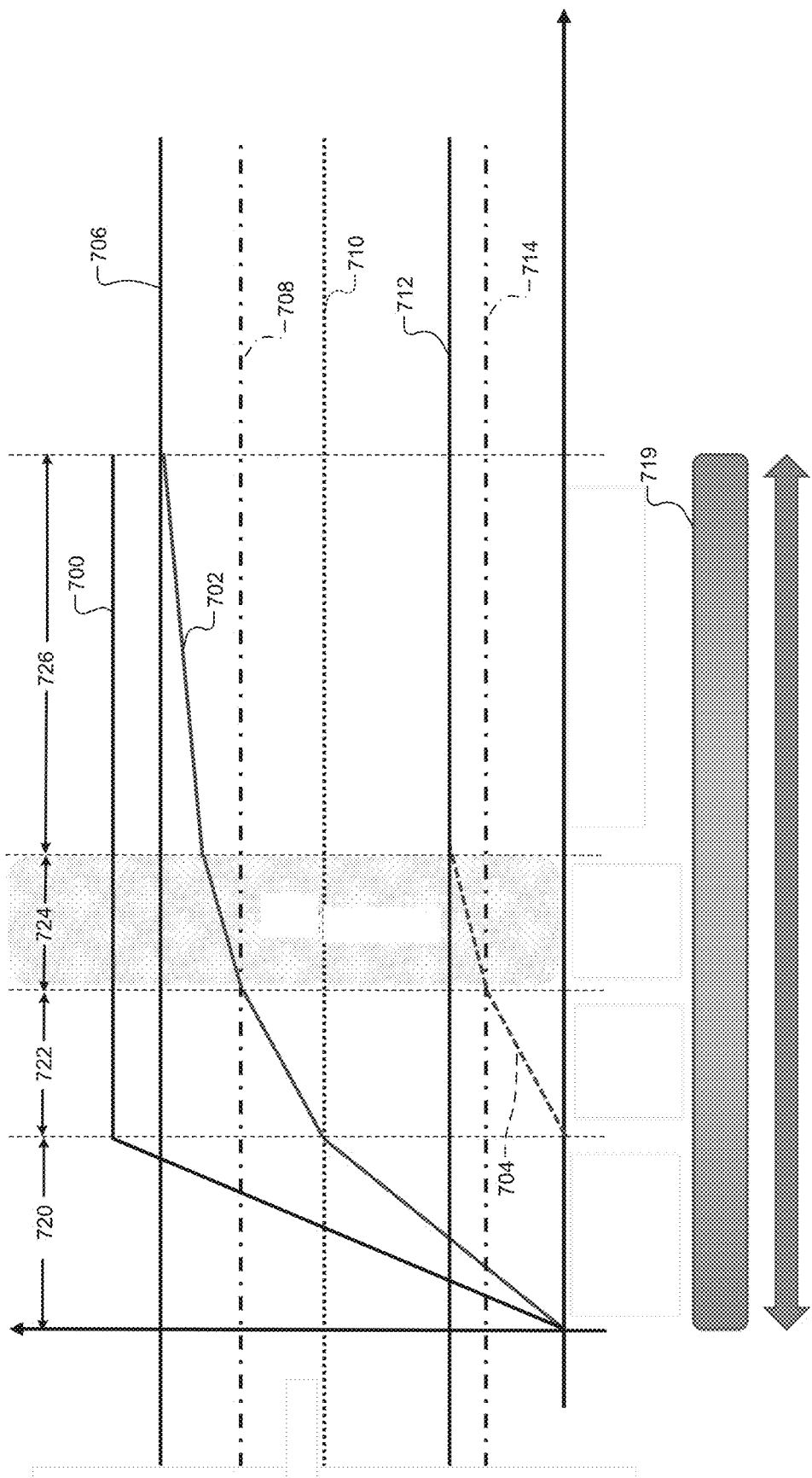
FIG. 7 is an example torque versus time plot illustrating transitioning between torque redistribution and torque limit control modes for a corner exiting event with a high friction road surface condition and a drivetrain system that is primarily rear wheel driven in accordance with the present disclosure.
Figure 8:
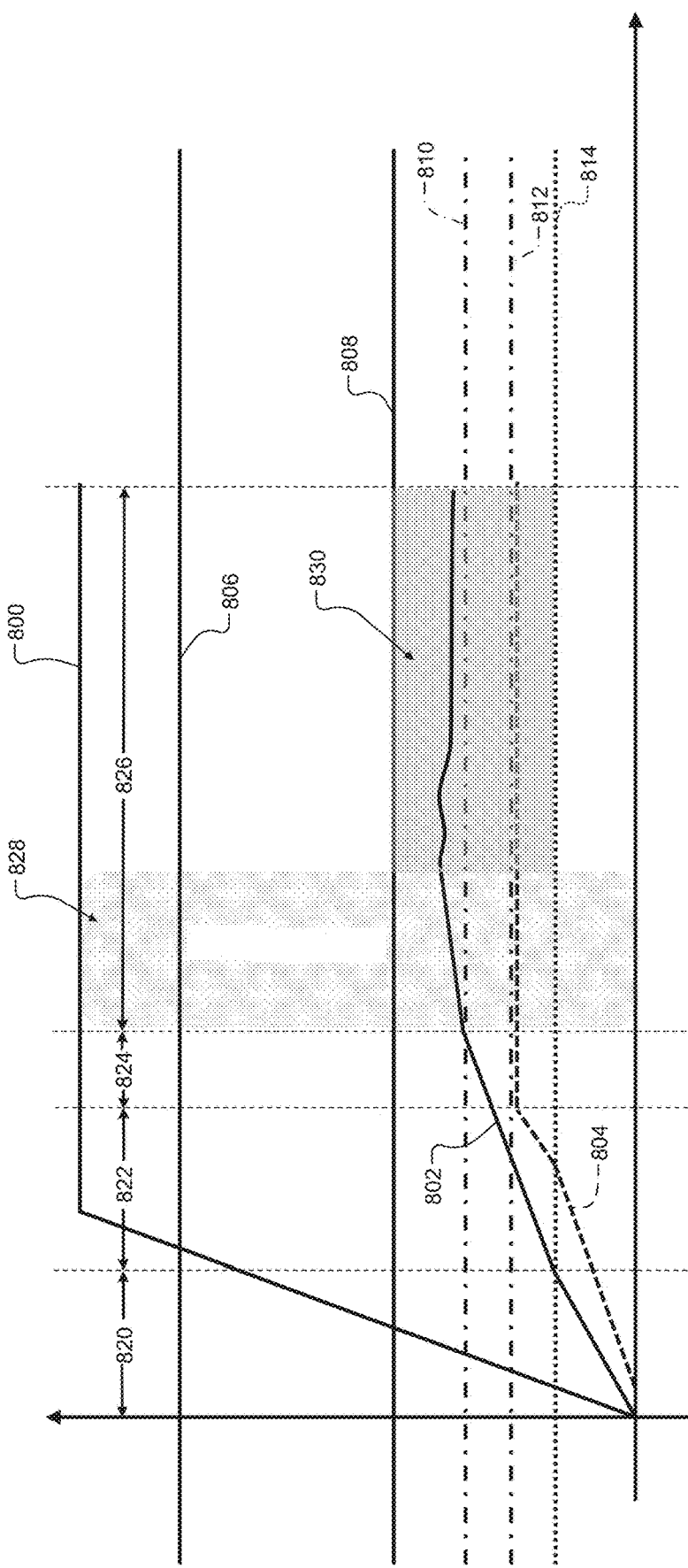
FIG. 8 is another example torque versus time plot illustrating transitioning between torque redistribution, torque limit control and feedback wheel slip control modes for a straight-line acceleration event with a low friction road surface condition and a drivetrain system that is primarily rear wheel driven in accordance with the present disclosure.

Although the following FIGS. 7-8 are described for a vehicle that is primarily rear wheel driven, similar operations may be performed for a vehicle that is primarily front wheel driven. Operations that are being described with respect to the rear axle would be performed for the front axle and vice versa. Also, the limits and thresholds would be adjusted accordingly. The operations described with respect to FIGS. 7-8 may be performed by one of the vehicle control modules disclosed herein.

FIG. 7 shows a torque versus time plot illustrating transitioning between torque redistribution and torque limit control modes for a corner exiting event with a high friction road surface condition and a drivetrain system that is primarily rear wheel driven. A driver total torque request curve 700, a rear axle torque curve 702 for a vehicle having a single rear axle, and a front axle torque curve 704 for the vehicle having a single front axle are shown. A rear engine torque limit (or first torque source limit) 706, a rear wheel limit 708, a rear wheel redistribution threshold 710, a front motor torque limit (or second torque source limit) 712, and a front wheel limit 714 are shown.

The example of FIG. 7 illustrates transitioning from being in a torque redistribution mode to a torque limit control mode, as represented by bar 719. This includes transitioning from initially being in a normal torque shaping mode 720, to a front and rear axle torque increasing mode 722, to a front and rear axle torque rate decreasing mode 724, and then to a dynamic torque shaping mode 726. Modes 720, 722 may refer to torque redistribution modes. Mode 724 may refer to a partial torque redistribution and torque limit control (or transition) mode.

During mode 720, the requested amount of torque from the driver increases at a first rate. The vehicle control module increases the rear axle torque (or torque to one or more rear axles) to accommodate the increase in driver requested torque. The vehicle control module transitions to mode 722 when the rear torque reaches the rear wheel redistribution threshold.

During mode 722, the vehicle control module increases both the rear axle torque and the front axle torque (or torque to one or more front axles). The rear axle torque is increased at a second rate. The second rate is less than the first rate experienced during mode 720. The front axle torque may be increased at the second rate or a different rate. Torque is increased at both axles to prevent an imbalance situation. At the end of mode 722, the rear and front axles begin to slip at the same time. Mode 722 begins when the amount of rear axle torque reaches the rear wheel redistribution threshold, which may be preset and/or adjusted. In an embodiment, the rear wheel redistribution threshold is arbitrarily set.

At the end of mode 722, the front and rear axles may begin to slip. Front axle slip causes understeer. Rear axle slip causes oversteer. If both axles are slipping at the same time by the same amount, neutral steering occurs.

During mode 724, the rear and front axle torques are increased. The rear axle torque is increased at a third rate that is less than the second rate. The front axle torque may be increased at the third rate or another rate. The front axle torque is increased at a slower rate than experienced during mode 722. During mode 724, the vehicle control module is transitioning between the torque redistribution mode to the torque limit control (or torque limitation) mode.

During mode 726, the rear axle torque is increased at a fourth rate that is less than the third rate. The front axle torque is not increased during this mode. The front axle torque is at the front motor limit. The rear axle torque is limited to the rear engine limit.

In the example shown, the normal torque shaping mode is implemented when the vehicle begins exiting the corner, operates in modes 722, 724 during a middle portion of the exit event, and operates in the dynamic torque shaping mode at the end of exiting the turn. After exiting the turn when the amount of driver torque requested decreases, the vehicle control module may operate in modes 720, 722, 724, 726 in a reverse order.

In an embodiment, the transition phase in and out thresholds for mode 724 are calculated based on a predicted time to reach a maximum motor capability or tire limit (before slip) on the front axle, whichever comes first.

FIG. 8 shows a torque versus time plot illustrating transitioning between torque redistribution, torque limit control and feedback wheel slip control modes for a straight-line acceleration event with a low friction road surface condition and a drivetrain system that is primarily rear wheel driven. A driver total torque request curve 800, a rear axle torque curve 802 for a vehicle having a single rear axle, and a front axle torque curve 804 for the vehicle having a single front axle are shown. A rear engine torque limit (or first torque source limit) 806, a front motor torque limit (or second torque source limit) 808, a rear wheel limit 810, a front wheel limit 812, and a rear wheel redistribution limit 814 are shown.

The example of FIG. 8 illustrates transitioning from being in a torque redistribution mode to a torque limit control mode. This includes transitioning from initially being in a preemptive torque distribution mode 820, to a front and rear axle torque increasing mode 822, to a front and rear axle torque rate decreasing mode 824, and then to a dynamic torque shaping mode 826. Modes 820, 822, 824 may refer to torque redistribution modes. The beginning (or first portion) of mode 826 may refer to a partial torque redistribution and partial torque limit control (or transition) mode. The second portion of mode 826 may refer to a torque limit control mode.

During mode 820, the requested amount of torque from the driver increases at a first rate. The vehicle control module increases the rear axle torque and the front axle torque to accommodate the increase in driver requested torque. Preemptive torque is sent to the front axle (or front axles) in addition to sending torque to the rear axle (or rear axles). The ramp rate of the torque to the front axle may be the same or different than the ramp rate of torque to the rear axle. In the example shown, the amount of torque provided to the front axle is less than the amount of torque provided to the rear axle. The ramp rate of torque provided to the front axle is also less than the ramp rate of torque to the rear axle.

During mode 822, the vehicle control module increases both the rear axle torque and the front axle torque. The rate of increase in the rear axle torque is less than the rate of increase in the rear axle torque during mode 820. The front axle torque is increased up to a level slightly below the front wheel limit 812. As an example, the front wheel torque may be equal to 95-98% of the front wheel limit 812. During mode 822, the front axle torque may change at different rates, as shown. During mode 822, torque is increased at both axles to prevent an imbalance situation. At the end of mode 822, the rear and front axles begin to slip at the same time. Mode 822 begins when the amount of rear axle torque reaches the rear wheel redistribution limit.

During mode 824, the rear axle torque is increased and the front axle torque is held constant. The ramp rates of the front and rear axle torque may be decreased. The ramp rate of the rear axle torque may be the same or less than the rate used during mode 822. The ramp rate of the front axle torque is reduced to zero.

When the rear axle torque reaches the rear wheel limit torque, mode 826 is performed and the vehicle control module transitions from the torque redistribution mode to the torque limit control mode. The vehicle control module operates in a dynamic torque shaping mode and handoffs to closed loop wheel slip control. This transition occurs at the beginning of the torque limit control mode 826 as shown by zone 828. At the end of the transition, the vehicle control module operates in a feedback wheel slip control mode, represented by area 830 of FIG. 8. During the feedback wheel slip control mode, the rear axle is experiencing a low level of slip and the front axle is outputting an amount of torque that is slightly less than an amount needed to cause slip in the front axle. The level of torque provided to the front axle is provided to retain steering. During the feedback wheel slip control mode, closed loop control is performed. The vehicle control module may track speed between the front and rear wheels and work to maintain a target amount on torque of the rear wheels.

In an embodiment, the rear axle torque is maintained slightly above the rear wheel limit (torque level at which rear wheels begin to slip). The front axle torque is maintained below the front wheel limit to promote neutral handling and steering feel by the driver. Similar control may be implemented for a vehicle that is primarily front wheel driven.

Figure 9:
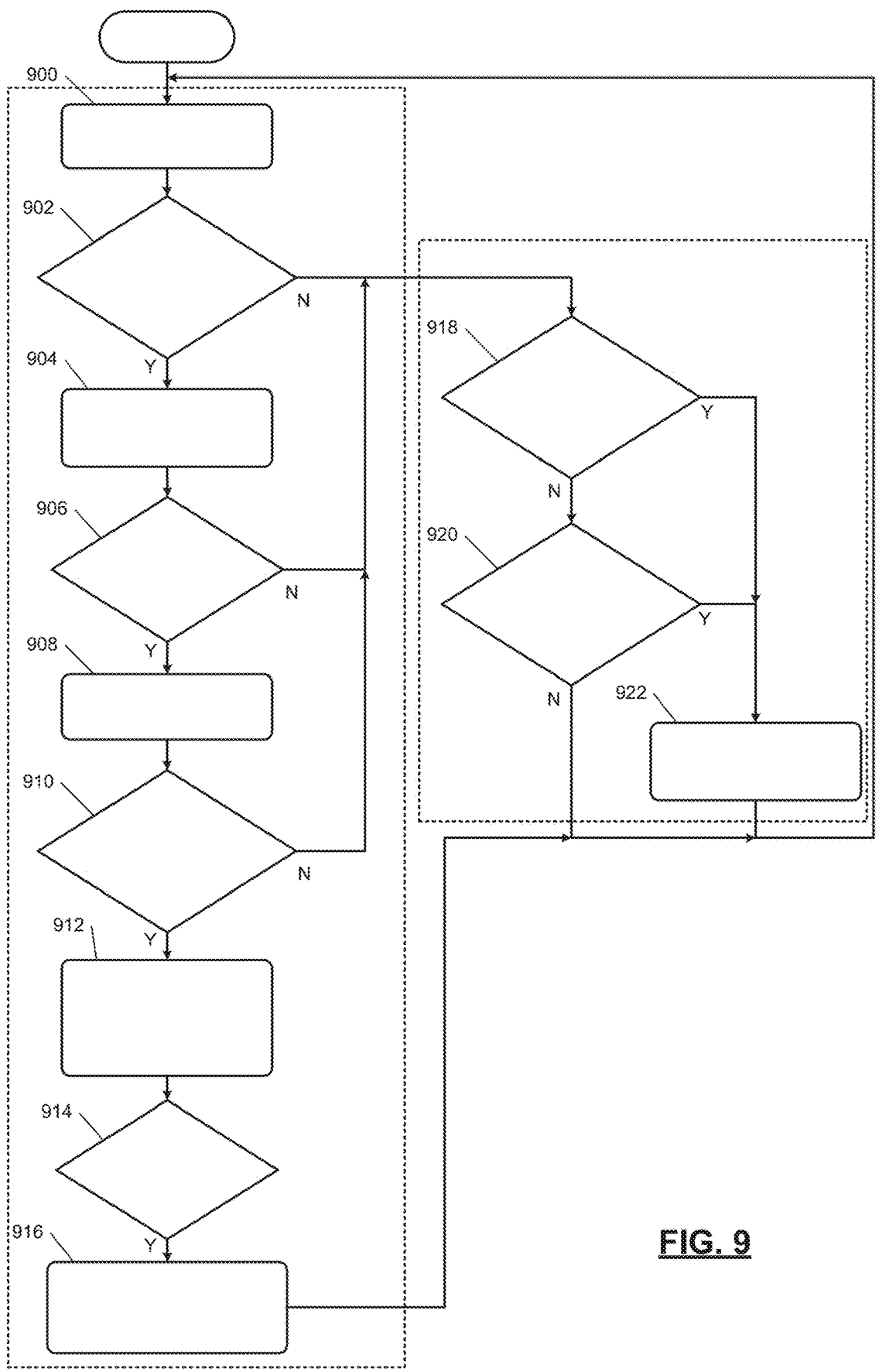
FIG. 9 illustrates a chassis control method including transitioning between torque redistribution and torque limit control modes in accordance with the present disclosure.

FIG. 9 shows a chassis control method including transitioning between torque redistribution and torque limit control modes. The following operations may be iteratively performed. The following operations may be performed by the vehicle control module 104 and/or the wheel slip and yaw module 108 of FIG. 1, and/or other modules disclosed herein. The following operations are applicable to a vehicle having one or more front axles and/or one or more rear axles. A reference to the front axle refers to one or more front axles and the torque provided to the front axle is distributed to the one or more front axles. A reference to a rear axle refers to one or more rear axles and the torque provided to the rear axle is distributed to the one or more rear axles. Operations 900, 902, 904, 906, 908, 910, 912, 914, 916 are associated with torque redistribution control. Operations 918, 920, 922 are associated with torque limit control. At 900, the vehicle control module 104 determines a total driver requested torque. This may be based on a throttle position.

At 902, the vehicle control module 104 determines whether the total driver requested torque is greater than a rear torque redistribution threshold. If yes operation 904 is performed, otherwise operation 918 is performed. At 904, the vehicle control module 104 provides a total rear threshold level of torque to the front axle. The total rear threshold level refers to a torque output limit of a torque source of the rear axle.

At 906, the vehicle control module 104 determines whether the amount of torque provided to the front axle is greater than the front wheel limit (referred to as front tire capacity) at which the front wheels begin to slip. At 908, the vehicle control module 104 provides excess torque back to the rear axle. The excess torque refers to a difference between the total rear threshold torque and the front tire capacity.

At 910, the vehicle control module 104 determines whether the amount of rear torque plus the excess torque is greater than the rear wheel limit (referred to as the rear tire capacity). If yes, operation 912 is performed, otherwise operation 918 is performed. At 912, the vehicle control module 104 distributes remaining torque between front and rear axles based on vehicle dynamic conditions.

At 914, the vehicle control module 104 determines whether the torque provided to the front axle is greater than the front torque limit. If yes, operation 916 is performed, otherwise operation 918 is performed. At 916, the vehicle control module 104 sends excess torque remaining to the rear axle and reduces a rate of change of the rear axle torque. Operation 900 may be performed after operation 916.

At 918, the wheel slip and yaw module 108 determines whether the rear wheel slip speed is greater than the front wheel slip speed. If not, operation 920 is performed, otherwise operation 922 is performed. At 920, the wheel slip and yaw module 108 determines whether a yaw rate of the corresponding vehicle is indicative of an oversteering event. If yes, operation 922 is performed, otherwise operation 900 is performed. At 922, the wheel slip and yaw module 108 reduces the amount of torque provided to the rear axle.

The following FIGS. 10-14 are example plots for neutral steer, counter steer, drift, drop throttle, and recovery modes of operation. The example plots are for a vehicle having one or more front axles and one or more rear axles. The following below description for FIGS. 10 and 12-14 are described with respect to a front axle and a rear axle. In the description of FIGS. 10 and 12-14, references to "the front axle" refer to one or more front axles and references to "the rear axle" refer to one or more rear axles.

Figure 11:
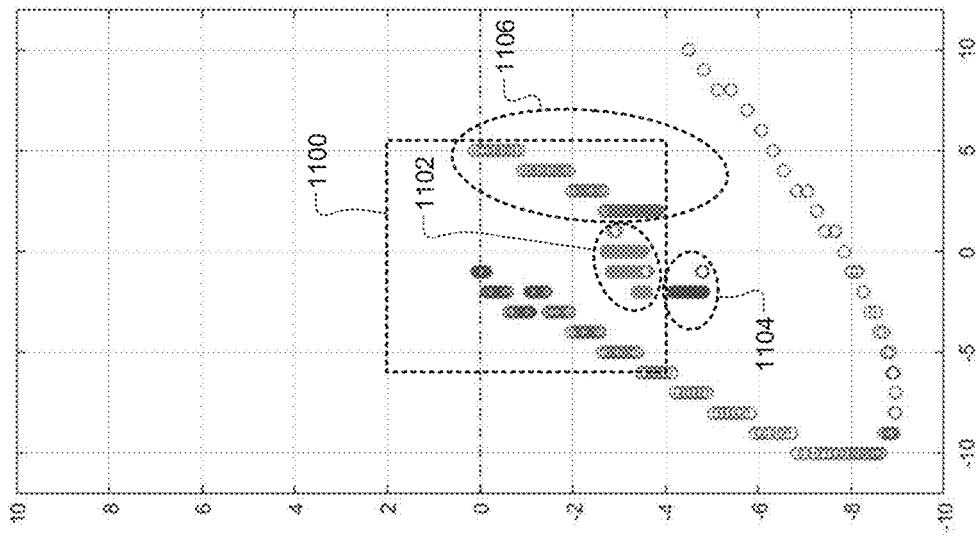
FIG. 11 is an example plot of understeering angle versus understeering velocity in relation to an example operation boundary for the example modes of operation of FIG. 10 in accordance with the present disclosure.
Figure 12:
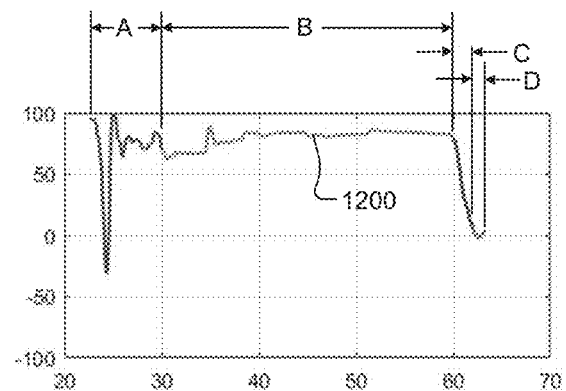
FIG. 12 is an example plot of steering angle versus time for the example modes of operation of FIGS. 10-11 in accordance with the present disclosure.
Figure 13:
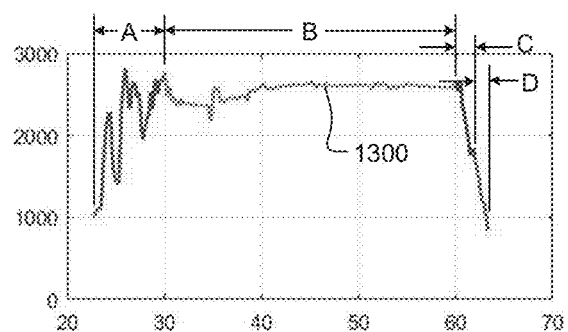
FIG. 13 is an example plot of front axle torque versus time for the example modes of operation of FIGS. 10-12 in accordance with the present disclosure.
Figure 14:
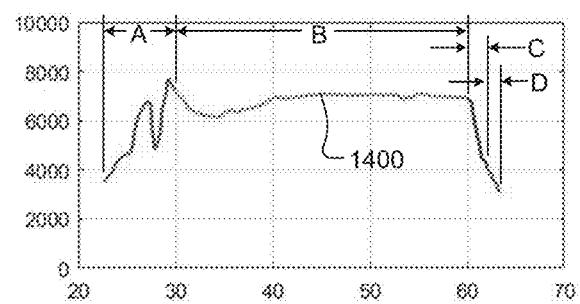
FIG. 14 is an example plot of rear axle torque versus time for the example modes of operation of FIGS. 10-13 in accordance with the present disclosure.

Each of FIGS. 10 and 12-14 includes a curve, where portions of the curve are associated respectively with the neutral steer, counter steer, drift, drop throttle, and recovery modes of operation. FIGS. 10 and 12-14 are provided as examples and are associated with the same order of the same events. One of the vehicle control modules disclosed herein may be implemented in a vehicle that has the understeering angles of FIG. 10 and the corresponding understeer velocities of FIG. 11. The vehicle control module monitors the understeering angle, the understeer velocity, and a steering angle of the vehicle and, based on these parameters and operation boundaries referred to below, adjusts the amount of torque provided to the front axle and the rear axle of the vehicle, as shown by FIGS. 13-14. A plot of steering angle is provided by FIG. 12.

Figure 10:
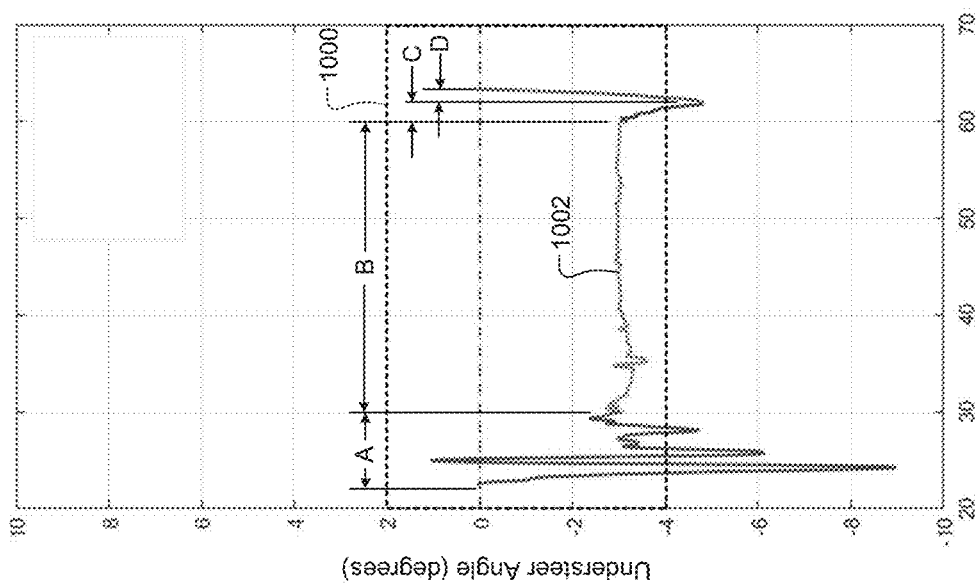
FIG. 10 is an example plot of understeering angle versus time in relation to an example operation boundary for different example modes of operation in accordance with the present disclosure.

FIG. 10 shows a plot of understeering angle versus time in relation to an example operation boundary 1000. The operation boundary 1000 is associated with oversteering without the vehicle spinning out. The phase plane module 106 of FIG. 1 prevents the vehicle from spinning out by operating within an operation boundary as described herein. In an embodiment, the phase plane module 106 allows the vehicle to slide, for example while operating in a drift mode, but prevents the vehicle from operating such that the vehicle spins out. The plot includes a curve 1002 having portions A, B, C, D, which are associated respectively with a counter steering mode, a drift mode, a drop throttle mode, and a recovery mode. These modes may be performed by the vehicle control module.

FIG. 11 shows a plot of understeering angle versus understeering velocity in relation to an example operation boundary 1100. Points in region 1102 are associated with the drift mode B. Points in region 1104 are associated with the drop throttle mode C. Points in region 1106 are associated with the recovery mode D. The other points of FIG. 11 are associated with the counter steering mode A.

FIG. 12 shows a plot of steering angle versus time. The plot includes a curve 1200 including portions A, B, C, D, which are associated respectively with the counter steering mode, the drift mode, the drop throttle mode, and the recovery mode.

FIG. 13 is an example plot of front axle torque versus time. The plot includes a curve 1300 including portions A, B, C, D, which are associated respectively with the counter steering mode, the drift mode, the drop throttle mode, and the recovery mode.

FIG. 14 is an example plot of rear axle torque versus time. The plot includes a curve 1400 including portions A, B, C, D, which are associated respectively with the counter steering mode, the drift mode, the drop throttle mode, and the recovery mode.

Figure 15:
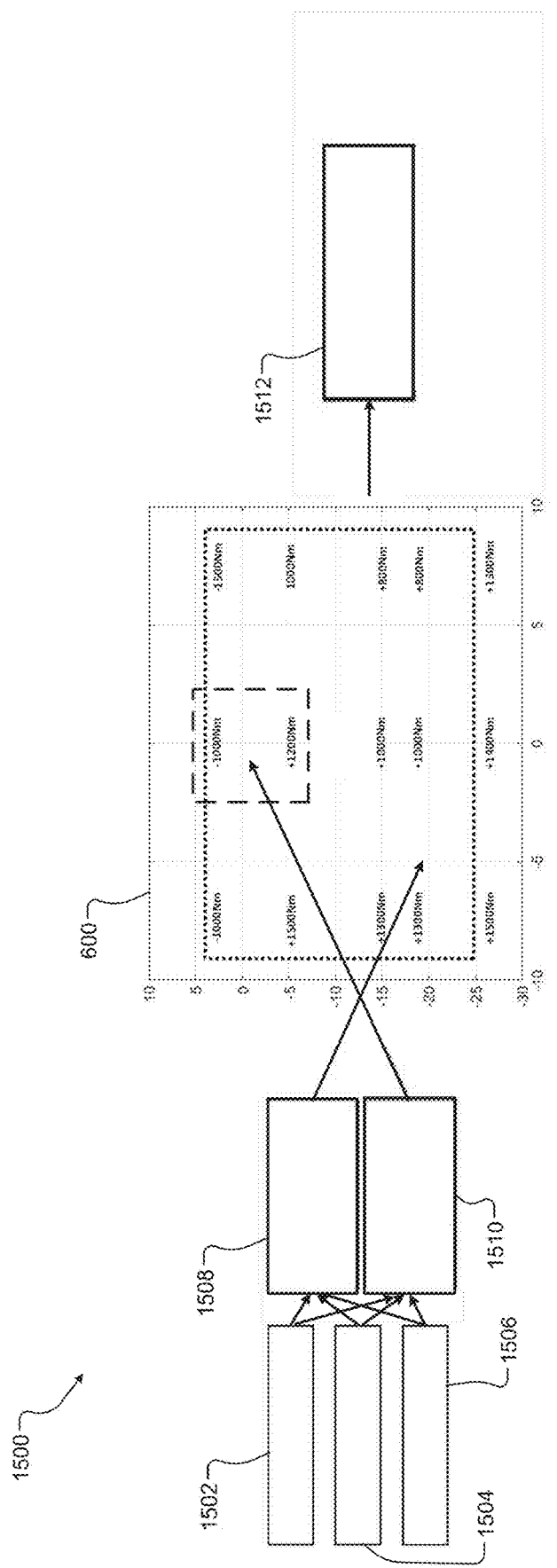
FIG. 15 is a control diagram illustrating an example use of the plot of FIG. 6 in accordance with the present disclosure.

FIG. 15 shows a control diagram 1500 illustrating an example use of the plot 600 of FIG. 6. The plot is of understeering angle versus understeering velocity including example amounts of torque to be supplied to front and rear axles. Senor inputs from, for example, a steering angle sensor 1502, a yaw rate sensor 1504, and wheel speed sensors 1506 are shown. Actual understeer dynamics 1508 and manipulated understeer dynamics 1510 are determined based on outputs of the sensors 1502, 1504, 1506. Torque shift amounts for shifting amounts of torque between front and rear axles are determined based on the actual understeer dynamics 1508 and the manipulated understeer dynamics 1510. Control commands 1512 are then generated to provide the torque shift amounts.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A chassis control system of a vehicle, the chassis control system comprising:
a first torque source configured to provide torque to a first axle of the vehicle;
a second torque source configured to provide torque to a second axle of the vehicle independently of the first torque source; and
a vehicle control module configured to control the first torque source and the second torque source to transition between a torque redistribution mode and a torque limit control mode based on a wheel torque redistribution threshold, a wheel torque limit of at least one of the first axle and the second axle, and a torque limit of one of the first torque source and the second torque source, where the torque redistribution mode refers to when torque is being selectively provided to the first axle by the first torque source and to the second axle by the second torque source, and where the torque limit control mode refers to when torque to at least one of first axle and the second axle is limited.

2. The chassis control system of claim 1, wherein:
the vehicle control module is configured to transition from a normal torque shaping mode to a torque increasing mode based on an amount of torque requested by a driver of the vehicle and the wheel torque redistribution threshold; and during the torque increasing mode, the vehicle control module increases torque on the first axle and the second axle concurrently.

3. The chassis control system of claim 2, wherein:
the vehicle control module increases torque on the first axle at a first rate and the second axle at a second rate until the torque on the second axle reaches the wheel torque limit of the second axle at which point the vehicle control module increases torque on the first axle at a third rate and on the second axle at a fourth rate;
the third rate being less than the first rate; and
the fourth rate being less than the second rate.

4. The chassis control system of claim 3, wherein:
the vehicle control module is configured to transition from the torque redistribution mode to the torque limit control mode when the torque on the second axle reaches the wheel torque limit of the second axle including increasing torque to the first axle at a fifth rate and to the second axle at a sixth rate;
the fifth rate being less than the third rate; and
the sixth rate being less than the fourth rate.

5. The chassis control system of claim 4, wherein the vehicle control module is configured, during operation in the torque limit control mode, to limit the torque provided to the first axle based on a torque limit of the first torque source, and to refrain from increasing torque on the second axle.

6. The chassis control system of claim 1, wherein the vehicle control module is configured to preemptively increase torque to the first axle and to the second axle based on a torque request from a driver of the vehicle.

7. The chassis control system of claim 6, wherein:
the vehicle control module is configured to transition from preemptively increasing torque to the first axle at a first rate and to the second axle at a second rate to operating in a torque increasing mode including increasing torque to the first axle at a third rate and to the second axle at a fourth rate;
the third rate being less than the first rate; and
the fourth rate being different than the second rate.

8. The chassis control system of claim 7, wherein the vehicle control module is configured to transition from the torque increasing mode to a torque rate reduction mode, where the torque rate reduction mode includes refraining from increasing the torque to the second axle and maintaining an amount of torque on the second axle below a wheel torque limit of the second axle.

9. The chassis control system of claim 8, wherein the vehicle control module is configured to transition from the torque redistribution mode to the torque limit control mode when the torque to the first axle reaches a wheel torque limit for the first axle.

10. The chassis control system of claim 9, wherein the vehicle control module is configured:
during the torque limit control mode, to transition to a feedback wheel slip control mode; and
during the feedback wheel slip control mode and based on speeds of wheels of the first axle and the second axle, to adjust torque of the first axle and allow the wheels of the first axle to slip, and to prevent wheels of the second axle from slipping and maintain torque on the second axle at a level below the wheel torque limit of the second axle.

11. The chassis control system of claim 1, wherein the vehicle control module is configured to
determine a lateral acceleration of the vehicle, an amount of torque requested by a driver of the vehicle, a speed of the vehicle, and a road surface condition;

determine an operation boundary for understeering angle versus understeering velocity based on the lateral acceleration of the vehicle, the amount of torque requested by the driver of the vehicle, the speed of the vehicle, and the road surface condition; and adjust torque to the first axle and the second axle to maintain operation of the vehicle in the operation boundary.

12. The chassis control system of claim 11, wherein:

the first axle is a front axle;

the second axle is a rear axle; and the vehicle control module is configured to correlate the operation boundary to a front to rear wheel slip target curve, and to adjust slip of the first axle and slip of the second axle based on the front to rear wheel slip target, and, during an oversteering event, to provide an increase the amount of slip of the first axle and then to decrease the amount of slip of the first axle to transition the vehicle towards neutral steering.

13. The chassis control system of claim 11, wherein:

the first axle is a front axle;

the second axle is a rear axle; and the vehicle control module is configured to correlate the operation boundary to a front to rear wheel slip target curve, and to adjust slip of the first axle and slip of the second axle based on the front to rear wheel slip target, and, based on the lateral acceleration of the vehicle, the amount of torque requested by the driver of the vehicle, the speed of the vehicle, and the road surface condition, i) to increase torque to the second axle to a first level, ii) to decrease torque to the second axle from the first level to a second level, and iii) then to increase torque to the second axle from the second level to a third level.

14. The chassis control system of claim 1, wherein the vehicle control module is configured to:

determine whether a driver requested amount of torque is greater than the wheel torque redistribution threshold;

in response to the driver requested amount of torque being greater than the wheel torque redistribution threshold, provide an amount of torque equal to a torque limit for the first axle from the second torque source to the second axle; and in response to the driver requested amount of torque not being greater than the wheel torque redistribution threshold, transitioning from operating in the torque redistribution mode to the torque limit control mode.

15. The chassis control system of claim 14, wherein the vehicle control module is configured to:

determine whether an amount of toque provided to the second axle is greater than a wheel torque limit for the second axle;

in response to the amount of torque provided to the second axle being greater than a wheel torque limit for the second axle, sending excess torque to the first axle via the first torque source, the excess torque being a difference between a total torque threshold of the first axle and the wheel torque limit of the second axle; and in response to the amount of torque provided to the second axle not being greater than a wheel torque limit for the second axle, transitioning from operating in the torque redistribution mode to the torque limit control mode.

16. The chassis control system of claim 15, wherein the vehicle control module is configured to:

determine whether a sum of torque provided to the first axle and the excess torque is greater than a wheel torque limit of the first axle;

in response to the sum being greater than the wheel torque limit of the first axle, distributing remaining torque between the first axle and the second axle via the first torque source and the second torque source; and in response to the sum not being greater than the wheel torque limit of the first axle, transitioning from operating in the torque redistribution mode to the torque limit control mode.

17. The chassis control system of claim 1, wherein the vehicle control module is configured, while operating in the torque limit control mode, to at least one of i) refrain from increasing torque to the first axle and ii) provide an amount of torque to the first axle such that wheels of the first axle are at wheel torque limits of the first axle, and to limit an amount of torque provided to the second axle.

18. A chassis control method comprising:

determining a lateral acceleration of a vehicle, an amount of torque requested by a driver of the vehicle, a speed of the vehicle, and a road surface condition;

determining an operation boundary based on the lateral acceleration of the vehicle, the amount of torque requested by the driver of the vehicle, the speed of the vehicle, and the road surface condition; and controlling a first torque source of a first axle of the vehicle and a second torque source of a second axle of the vehicle to transition between a torque redistribution mode and a torque limit control mode based on the operation boundary, a wheel torque redistribution threshold, a wheel torque limit of at least one of the first axle and the second axle, and a torque limit of one of the first torque source and the second torque source, where the torque redistribution mode refers to when torque is being selectively provided to the first axle by the first torque source and to the second axle by the second torque source, and where the torque limit control mode refers to when torque to at least one of first axle and the second axle is limited.

19. The chassis control method of claim 18, further comprising:

correlating the operation boundary to a wheel slip target; and based on the wheel slip target, adjusting wheel slip of the first axle and wheel slip of the second axle.

20. The chassis control method of claim 18, further comprising based on driver torque request inputs and sensor feedback, scheduling non-linear control gains to adjust torque from the first torque source to the first axle and to adjust torque from the second torque source to the second axle.

* * * * *